United States Patent
Barthel et al.

(10) Patent No.: US 10,160,454 B2
(45) Date of Patent: Dec. 25, 2018

(54) SENSOR ARRANGEMENT FOR DETECTING A STATE OF A ROAD WITH AT LEAST TWO ULTRASOUND SENSORS ARRANGED APART FROM ONE ANOTHER, DRIVER ASSISTANCE SYSTEM, MOTOR VEHICLE AND ASSOCIATED METHOD

(71) Applicant: VALEO Schalter und Sensoren GmbH, Bietigheim-Bissingen (DE)

(72) Inventors: Natalie Barthel, Bietigheim-Bissingen (DE); Wolfgang Hamm, Bietigheim-Bissingen (DE); Thomas Jung, Bietigheim-Bissingen (DE); Thomas Schuler, Bietigheim-Bissingen (DE); Marian Roeger, Bietigheim-Bissingen (DE); Felix Haering, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/569,335

(22) PCT Filed: Apr. 22, 2016

(86) PCT No.: PCT/EP2016/059030
§ 371 (c)(1),
(2) Date: Oct. 25, 2017

(87) PCT Pub. No.: WO2016/173945
PCT Pub. Date: Nov. 3, 2016

(65) Prior Publication Data
US 2018/0065640 A1  Mar. 8, 2018

(30) Foreign Application Priority Data
Apr. 27, 2015  (DE) .......................... 10 2015 106 401

(51) Int. Cl.
*B60W 40/06* (2012.01)
*B60T 8/172* (2006.01)
(Continued)

(52) U.S. Cl.
CPC ............. *B60W 40/06* (2013.01); *B60T 8/172* (2013.01); *B60W 30/143* (2013.01); *G01S 7/539* (2013.01);
(Continued)

(58) Field of Classification Search
CPC .. B60C 5/008; B60C 1/00; B60C 5/00; B60C 1/50; B60C 9/00; B60C 9/008; B60K 35/00; G08B 21/182; G08B 21/06
(Continued)

(56) References Cited

U.S. PATENT DOCUMENTS

| 5,521,594 A | 5/1996 | Fukushima | |
|---|---|---|---|
| 2013/0336090 A1* | 12/2013 | Tran .................. | B60G 17/0165 367/13 |
| 2015/0046071 A1* | 2/2015 | Clarke ............ | B60W 30/18018 701/112 |

FOREIGN PATENT DOCUMENTS

| DE | 37 28 708 A1 | 3/1989 |
|---|---|---|
| DE | 42 13 221 A1 | 10/1993 |

(Continued)

OTHER PUBLICATIONS

International Search Report of the International Searching Authority issued in PCT/EP2016/09030 dated Jul. 14, 2016 (3 pages).
(Continued)

*Primary Examiner* — Joseph Feild
*Assistant Examiner* — Sharmin Akhter
(74) *Attorney, Agent, or Firm* — Osha Liang LLP

(57) ABSTRACT

The invention relates to a sensor arrangement (3) for detecting a state of a road (11), with a sensor device (9) which is
(Continued)

designed to detect an impact of water (12) on a wheel arch lining (13) of a motor vehicle (1) while the motor vehicle (1) is travelling on the road (11), and with a control device (7) for detecting the state of the road (11) on the basis of the impact of the water (12) detected by means of the sensor device (9), wherein the sensor device (9) has a first and a second ultrasound sensor (4, 5) which are designed in each case to receive an ultrasound signal and which are furthermore designed in each case to detect the impact of the water (12) on the wheel arch lining (13), wherein the first and the second ultrasound sensor (4, 5) are arranged apart from one another on or in the wheel arch lining (13).

14 Claims, 3 Drawing Sheets

(51) Int. Cl.
    *B60W 30/14*     (2006.01)
    *G01S 15/93*     (2006.01)
    *G01S 15/02*     (2006.01)
    *G01S 7/539*     (2006.01)
    *G01S 15/87*     (2006.01)
    *B60W 50/00*     (2006.01)

(52) U.S. Cl.
    CPC ............ *G01S 15/025* (2013.01); *G01S 15/87* (2013.01); *G01S 15/931* (2013.01); *B60T 2210/13* (2013.01); *B60W 2050/0083* (2013.01); *B60W 2420/54* (2013.01); *B60W 2550/12* (2013.01); *G01S 2015/937* (2013.01)

(58) Field of Classification Search
    USPC ..... 340/425.5, 612, 618; 701/36–38, 70, 93; 73/1.79, 1.81
    See application file for complete search history.

(56) References Cited

FOREIGN PATENT DOCUMENTS

| | | |
|---|---|---|
| DE | 195 43 137 A1 | 5/1997 |
| DE | 42 35 809 C2 | 12/1997 |
| DE | 197 45 684 A1 | 4/1999 |
| DE | 100 09 911 C1 | 10/2001 |
| DE | 10 2004 016900 A1 | 10/2005 |
| DE | 10 2005 023696 A1 | 11/2006 |
| DE | 10 2008 014 513 A1 | 10/2008 |
| DE | 10 2010 008 258 A1 | 8/2011 |
| DE | 10 2011 113908 A1 | 3/2012 |
| DE | 10 2012 221 518 A1 | 5/2014 |
| EP | 2 698 299 A1 | 2/2014 |

OTHER PUBLICATIONS

Written Opinion of the International Searching Authority issued in PCT/EP2016/059030 dated Jul. 14, 2016 (6 pages).
German Search Report in corresponding Application No. 10 2015 106 401.4 dated Mar. 31, 2016 (10 pages).

\* cited by examiner

SENSOR ARRANGEMENT FOR DETECTING A STATE OF A ROAD WITH AT LEAST TWO ULTRASOUND SENSORS ARRANGED APART FROM ONE ANOTHER, DRIVER ASSISTANCE SYSTEM, MOTOR VEHICLE AND ASSOCIATED METHOD

The present invention relates to a sensor arrangement for detecting a state of a road, with a sensor device which is designed to detect an impact of water on a wheel arch lining of the motor vehicle when the motor vehicle is travelling, and with a control unit to detect the state of the road on the basis of the impact of the water detected by means of the sensor device. The invention furthermore relates to a driver assistance system with a sensor arrangement of this type. The present invention further relates to a motor vehicle with a driver assistance system of this type. Finally, the present invention relates to a method for detecting a state of a road.

Interest is focused here, in particular, on sensor arrangements which are designed to detect a state of a road. A sensor arrangement of this type may comprise, for example, a sensor device with which it is possible to detect whether the road is dry or whether water, ice or snow is present on the road. The coefficient of friction between the road and the tyres of the motor vehicle can be determined from the state of the road. This information can be used by a driver assistance system of the motor vehicle. For example, the speed of the motor vehicle can be adjusted depending on the identified state of the road or the coefficient of friction. A driver assistance system of this type may also be a traction control system or an electronic stability program to which the information relating to the state of the road is fed.

In this context, DE 37 28 708 A1 describes a method for detecting the coefficient of friction between a road and the tyre of a motor vehicle. The rolling noises of at least one tyre are recorded here with a microphone and the frequency of the recorded signal is analysed. The state of the road can then be inferred from the frequency spectrum.

In addition, DE 100 09 911 C1 describes a system for monitoring the air pressure of a motor vehicle tyre by means of a sensor which is arranged in an air volume of an air spring. Sound vibrations which occur in the air volume due to the wheel vibrations are picked up by the sensor. The sensor may be designed as a microphone or as a pressure sensor. The wheel vibrations are transmitted as structure-borne sound via the chassis onto the air spring. The sensor may be designed here as a microphone or as a pressure sensor.

A device for detecting a rolling noise of a vehicle tyre is furthermore known from DE 10 2008 014 513 A1. The device comprises a sensor which serves to detect the rolling noise and which is arranged in a housing which is attached to the vehicle in a vibration-isolated manner. The sensor is preferably designed as a microphone. Alternatively, a different suitable measurement recorder, for example a pressure sensor or an ultrasound sensor, can also be used as the sensor.

To enable early detection of the occurrence of a risk of aquaplaning, DE 10 2010 008 258 A1 proposes a method in which route-section-related information concerning the risk of aquaplaning is provided to the motor vehicle. At least one sensor device for determining a wet road surface is furthermore provided. If a section of the route with a risk of aquaplaning occurs and a wet road surface is detected, an assistance function in the prevention of aquaplaning is performed.

A method for determining road slipperiness is also known from DE 10 2012 221 518 A1. Here, a sensor detects the spray thrown up by a wheel of the vehicle. The slipperiness of the road is calculated from the thrown-up spray. A sensor, for example, which is designed as a drop detector can be used to detect the thrown-up spray. A moisture sensor or a sensor for the contactless detection or counting of thrown-up particles can furthermore be used. Water droplets, snowflakes, ice particles and/or dust particles can be detected with the sensor.

In addition, a method in which the water which impacts on a wheel arch lining is detected with a sensor is described in the article entitled "Sensor Systems and Signal Processing for Advanced Driver Assistance" by K. Naab and R. Hoppstock, published at the "Smart Vehicles" Congress, 1995. It is furthermore described there that the noise in the wheel arch changes with the vehicle speed, the engine speed and the water level on the road surface. The first two factors can easily be corrected, so that only the amount of water which impacts on the wheel arch lining remains. The noise can be measured with a microphone. The noise can be filtered with the band-pass filter in a frequency range between 2.5 and 4.5 kHz. The noise can furthermore be converted into a characteristic DC voltage level which correlates with the absolute water level on the road surface.

A road vehicle which has a sensor device for detecting a depth of water in an environment of the vehicle is furthermore described in EP 2 698 299 A1. The sensor device may comprise lidar sensors or ultrasound sensors.

The object of the present invention is to indicate a solution for detecting the state of a road with a sensor arrangement of the aforementioned type with a reduced processing requirement.

This object is achieved according to the invention by a sensor arrangement, a driver assistance system, a motor vehicle and a method with the features according to the respective independent patent claims. Advantageous embodiments of the invention form the subject-matter of the dependent patent claims, the description and the figures.

A sensor arrangement according to the invention for determining a state of a road comprises a sensor device which is designed to detect an impact of water on a wheel arch lining of a motor vehicle while the motor vehicle is travelling on the road. In addition, the sensor arrangement comprises a control unit for detecting the state of the road on the basis of the impact of the water detected by means of the sensor device. The sensor device has a first and a second ultrasound sensor which are designed in each case to receive an ultrasound signal and which are furthermore designed in each case to detect the impact of water on the wheel arch lining, wherein the first and the second ultrasound sensor are arranged apart from one another on or in the wheel arch lining.

The present invention is based on the realization that microphones or structure-borne sound microphones with which the impact of water on the wheel arch lining is determined are not designed for long-term use in the wheel arch. Microphones of this type are furthermore too expensive for use in series production. Instead of microphones, a sensor device is now used which has a first ultrasound sensor and at least one second ultrasound sensor. ultrasound sensors of this type are used, for example, in connection with parking assistance systems in motor vehicles. The first and the second ultrasound sensor are preferably designed with an identical structure. The first and the second ultrasound sensor may thus be designed to emit an ultrasound signal. For this purpose, mechanical vibrations are induced in each case in a membrane of the ultrasound sensor with a corresponding transducer element. The ultrasound sensor may, for example, have a frequency of around 50 kHz. The ultrasound signal reflected by an object may furthermore be received once more with the respective ultrasound sensor. In particular, an ultrasound signal which is produced by the impact of the water on the wheel arch lining can be received with the first and the second ultrasound sensor. For this purpose, the vibration of the membrane which is generated by the reflected ultrasound signal is detected with the transducer element. An ultrasound sensor of this type is characterized by its low procurement costs and its resilience to environmental influences.

The first and the second ultrasound sensor are preferably arranged in an area of the wheel arch or a wheel housing of the motor vehicle. The wheel arch describes the area of the motor vehicle in which the wheels of the motor vehicle or at least areas of the wheels are arranged. A wheel arch lining is arranged in the wheel arch. This wheel arch lining faces a running surface of the wheel or tyre, or at least areas thereof. The wheel arch lining, which may also be referred to as the wheel cup, may be made, for example, from a plastic. The wheel arch lining is arranged, in particular, inside the wheel arch or wheel housing. Water which impacts on the wheel arch lining can now be detected with the first ultrasound sensor and the second ultrasound sensor. Particles, for example dirt particles, may also be dissolved in the water. If the motor vehicle is moved on the road, water which is present on the surface of the road may be thrown up by the rotation of the wheel of the motor vehicle onto the wheel arch lining. The water which is present on the road surface then impacts on the wheel arch lining as water drops or spray water. It is thus possible to check using the ultrasound sensors whether water is present on the surface of the road. The state of the road or road surface can be detected in this way. The coefficient of friction between the tyres or the wheels of the motor vehicle and the road can then be inferred from the detected state of the road.

The first and the second ultrasound sensor are preferably arranged apart from one another along a direction of rotation of a wheel of the motor vehicle. The direction of rotation of the wheel describes the direction of the rotation of the wheel when rolling on the surface of the road. The wheel can essentially be rotated in two different directions, depending on whether the motor vehicle is moved in a forward direction of travel or in a reverse direction of travel. Two ultrasound sensors are arranged apart from one another along the direction of rotation of the wheel. It can also be provided that the first and the second ultrasound sensor are arranged apart from one another along a main extension direction of the wheel arch lining. The impact of the water on the wheel arch lining can thus be determined at different positions of the wheel arch lining. An area of impact of the spray water or water on the wheel arch lining, for example, can thus be determined.

In one embodiment, the first ultrasound sensor is arranged in front of the second ultrasound sensor along the direction of rotation of the wheel when the motor vehicle is moved in a forward direction of travel. If the motor vehicle is moved in a forward direction of travel, the wheel is rolled off accordingly on the surface of the road. A corresponding reference point on a running surface of the tyre is arranged initially in the area of the first ultrasound sensor and subsequently in an area of the second ultrasound sensor when the wheel rotates along the direction of rotation. The first ultrasound sensor may be arranged, for example, behind the wheel, starting from a central point of the wheel along the longitudinal axis of the vehicle. The second ultrasound sensor may have a higher installation position than the first ultrasound sensor. The spray water which is thrown up from the road can thus be detected at different positions or a check can be carried out to determine the position up to which the spray water is thrown up.

The first and the second ultrasound sensor are preferably arranged in such a way that the water impacting on the wheel arch lining produces a mechanical vibration of a respective membrane of the first and the second ultrasound sensor. In particular, the first and the second ultrasound sensor can be arranged on or in the wheel arch lining in such a way that mechanical vibrations can be transmitted from the wheel arch lining through solid-borne sound to the respective membranes of the ultrasound sensors. If water is thrown up from the road surface onto the wheel arch lining when the motor vehicle is travelling, mechanical vibrations can be induced in the wheel arch lining. These mechanical vibrations can then be detected with the respective ultrasound sensors. In addition, an acoustic signal which induces mechanical vibrations in the respective membranes of the ultrasound sensors may be generated by the water impacting on the wheel arch lining. It is thus possible to check whether water is present on the road surface using a conventional ultrasound sensor.

In a further embodiment, the first and the second ultrasound sensor are designed in each case to output a sensor signal and the control unit is designed to detect the state of the road on the basis of the respective sensor signals. For example, a first signal can be output with the first ultrasound sensor and a second sensor signal can be output with the second ultrasound sensor. The respective sensor signal describes, in particular, the mechanical vibration of the membrane of the ultrasound sensors depending on time. The respective sensor signals may, for example, be output in the form of an electric voltage using the transducer element of the respective ultrasound sensors. It may also be provided that the first ultrasound sensor and the second ultrasound sensor output a digital sensor signal. A signal with the value 1 is output here if an amplitude of the vibration of the membrane falls below a threshold value, and a signal with the value 0 is output if the amplitude of the vibration of the membrane exceeds the threshold value. It is possible to check in a simple manner whether water is impacting on the wheel arch lining on the basis of the respective sensor signals. The amplitude of the respective sensor signals, for example, can be checked for this purpose. It is thus possible to determine whether spray water is or is not impacting in the respective area of the wheel arch lining which is assigned to the first or to the second ultrasound sensor.

In a further design, the control unit is designed to detect a presence of water on a surface of the road on the basis of the sensor signals of the first and/or the second ultrasound sensor. The amplitudes of the respective sensor signals can be evaluated for this purpose. If the amplitude of the respective sensor signals exceeds a predetermined limit value, it can be assumed that spray water is impacting on the area of the wheel arch lining which is assigned to the respective ultrasound sensor. If a sensor signal which describes the impact of the water on the wheel arch lining is provided with the first ultrasound sensor and/or the second ultrasound sensor, it can be assumed that the road is wet. If a sensor signal which essentially has no or only very slight vibrations is provided in each case with the first and/or the second ultrasound sensor, it can be assumed that the road is dry.

In a further embodiment, the control unit is designed to identify an amount of water which is present on a surface of the road on the basis of the sensor signals of the first and/or the second ultrasound sensor. If, for example, the first ultrasound sensor is arranged in front of the second ultrasound sensor in the direction of rotation of the wheel when the motor vehicle is travelling forwards, it can be assumed that the amount of water is relatively small if the impact of water is detected with the first ultrasound sensor only. However, if the impact of water is detected with both the first and the second ultrasound sensor, it can be assumed that a relatively large amount of water is present on the road surface. It can furthermore be taken into account here that the point of impact of the spray water on the wheel arch lining is dependent on both the speed of the motor vehicle or the rotational speed of the wheel and on the amount of water on the surface of the road. The current speed of the motor vehicle, which can be detected with a corresponding speed sensor, can furthermore be taken into account in order to determine the amount of water. The amount of water which is present on the surface of the road can thus be determined in a simple manner.

The first and the second ultrasound sensor are preferably arranged on a side of the wheel arch lining facing away from the wheel of a motor vehicle. In other words, the first ultrasound sensor and the second ultrasound sensor are arranged concealed behind the wheel arch lining. The ultrasound sensors may be arranged on a rear side of the wheel arch lining. The respective membranes of the ultrasound sensors may be mechanically coupled with the wheel arch lining. The ultrasound sensors may furthermore be attached with respective retaining elements on the rear side of the wheel arch lining. If the ultrasound sensors are arranged concealed behind the wheel arch lining, they can, in particular, be protected against environmental influences and can therefore be reliably operated.

In a further design, the sensor device has at least one third ultrasound sensor which is arranged on or in the wheel arch lining. The third ultrasound sensor may similarly be arranged apart from the first and the second ultrasound sensor. For example, the at least one third ultrasound sensor may be arranged behind the second ultrasound sensor in the direction of rotation of the tyre when the motor vehicle is travelling forwards. The point of impact of the water on the wheel arch lining can thus be determined more precisely.

A driver assistance system for a motor vehicle according to the invention comprises a sensor arrangement according to the invention. The sensor arrangement may also comprise a plurality of sensor devices which are connected to the control unit for data transmission. For example, a sensor device can be assigned to each wheel or each wheel arch. It can also be provided that a plurality of sensors are arranged on or in a wheel arch.

The driver assistance system is preferably designed to output a warning message to a driver of the motor vehicle depending on the state of the road detected with the sensor arrangement. If it is detected by means of the sensor arrangement that the road is wet, a corresponding warning message can be output to the driver of the motor vehicle. This warning message can be output to the driver of the motor vehicle in visual, audible and/or haptic form. In particular, a warning message can be output to the driver if a risk of aquaplaning is detected by means of the sensor arrangement. The warning message may contain the information that the driver should reduce his speed.

In a further design, the driver assistance system is designed to adjust the speed of the motor vehicle depending on the state of the road detected with the sensor arrangement. If, for example, it is detected with the sensor arrangement that the amount of water present on the road surface exceeds a predetermined limit value, the speed of the motor vehicle can be reduced using the driver assistance system. The driver assistance system can perform an intervention in the braking system of the motor vehicle for this purpose. The risk of aquaplaning can be reduced by reducing the speed of the motor vehicle.

A motor vehicle according to the invention comprises a driver assistance system according to the invention. The motor vehicle is designed, in particular, as a passenger vehicle.

A method according to the invention serves to detect a state of a road. An impact of water on a wheel arch lining of the motor vehicle is detected here by means of a sensor device while the motor vehicle is travelling on the road. The state of the road is furthermore detected by means of a control unit on the basis of the impact of the water detected by means of the sensor device. The sensor device comprises a first ultrasound sensor and a second ultrasound sensor which are designed in each case to receive an ultrasound signal, wherein the impact of the water on the wheel arch lining is detected with the first ultrasound sensor and the second ultrasound sensor.

The preferred embodiments and their advantages, presented with reference to the sensor arrangement according to the invention, apply accordingly to the driver assistance system according to the invention, the motor vehicle according to the invention and the method according to the invention.

Further features of the invention can be found in the claims, the figures and the description of the figures. The features and feature combinations specified above in the description, and also the features and feature combinations shown below in the description of the figures and/or in the figures alone are usable not only in the respectively indicated combination, but also in other combinations or in isolation without departing the scope of the invention. Details of the invention which are not explicitly shown and explained in the figures, but which emerge and can be produced from the explained details through separated feature combinations are thus also to be regarded as included and disclosed. Details and feature combinations which do not therefore have all of the features of an originally formulated independent claim are also to be regarded as disclosed.

The invention will now be explained in detail on the basis of preferred example embodiments and with reference to the attached drawings.

Figure 2:
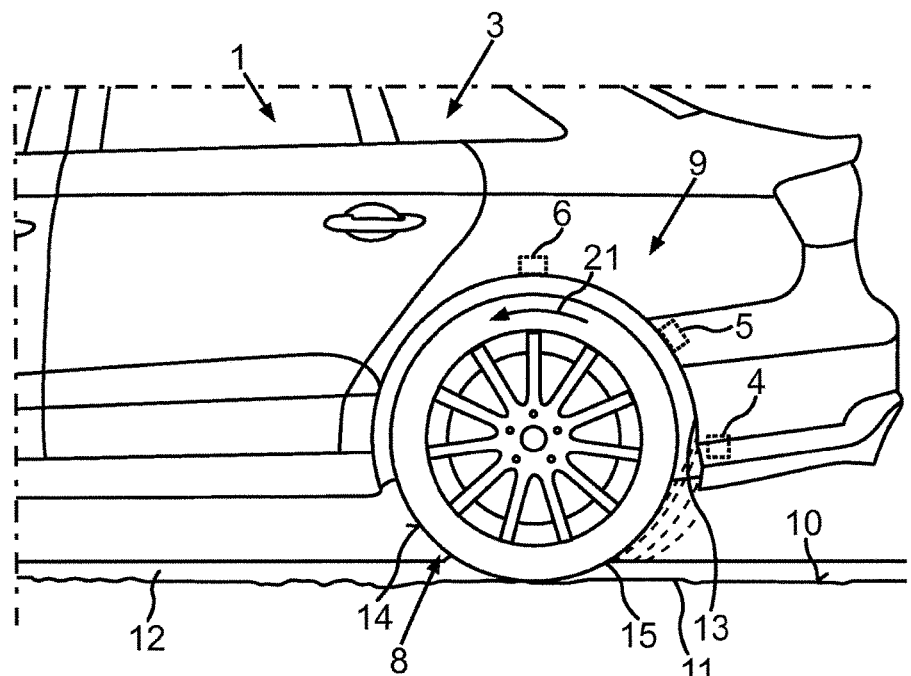
FIG. 2 shows the motor vehicle according to FIG. 1, in which three ultrasound sensors of the sensor arrangement are arranged behind a wheel arch lining.
Figure 3:
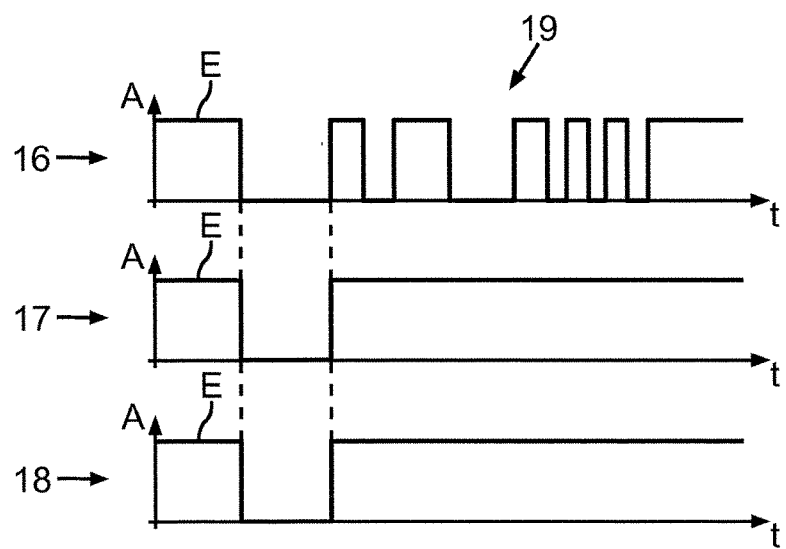
Figure 4:
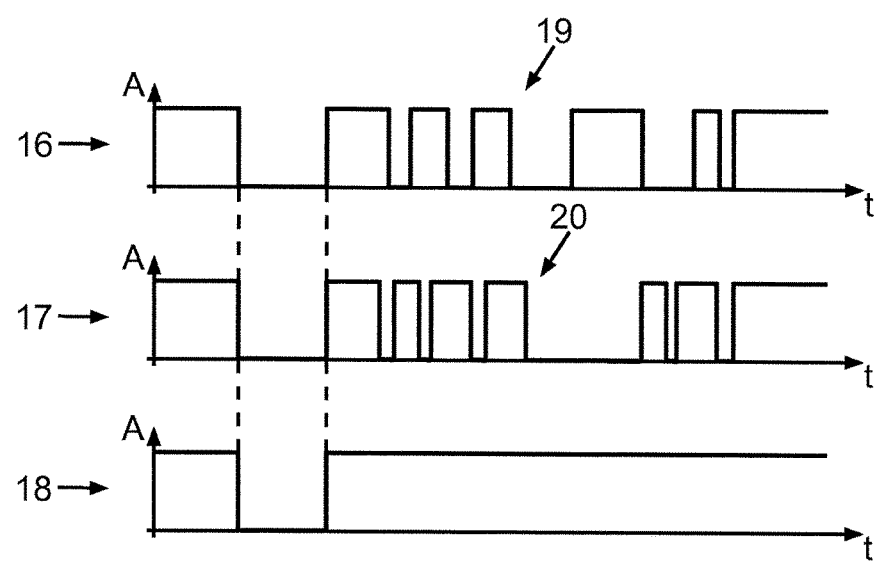

FIG. 3 a variation with time of the sensor signals of the three ultrasound sensors according to FIG. 2 with a relatively small amount of water on a surface of a road; and FIG. 4 a variation with time of the sensor signals of the three ultrasound sensors according to FIG. 2 with a relatively large amount of water on a surface of a road.

Identical and functionally identical elements are denoted in the figures with the same reference numbers.

Figure 1:
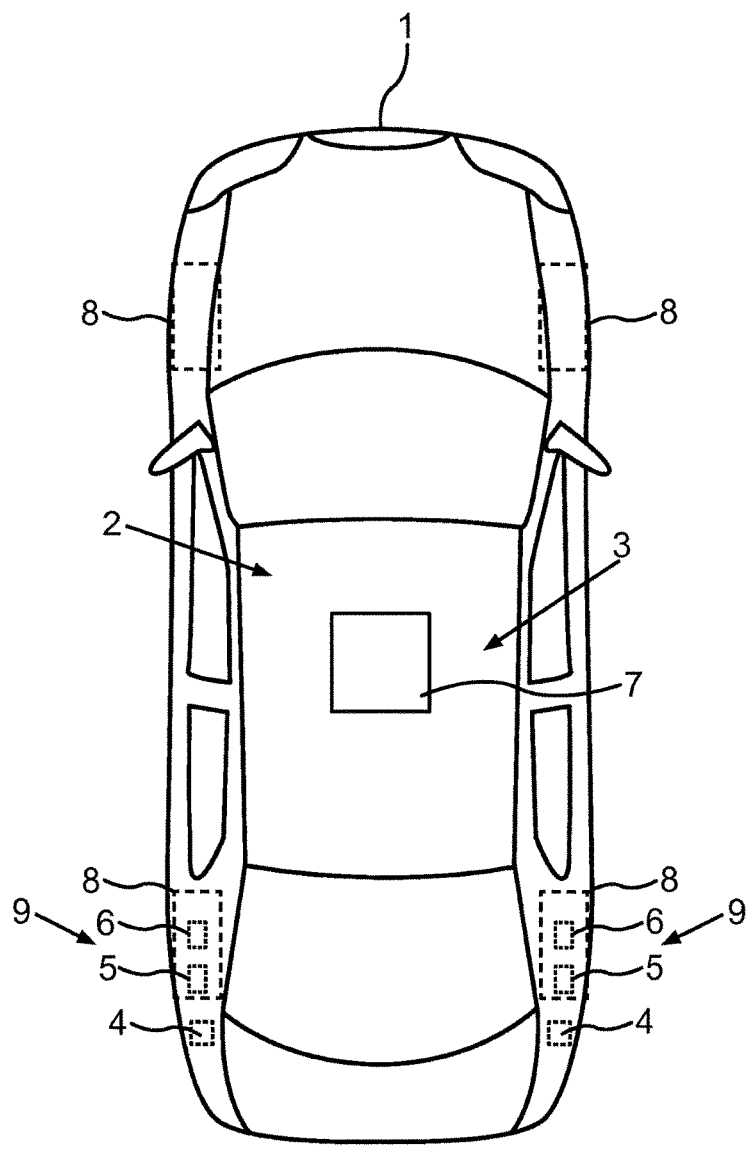
FIG. 1 shows a motor vehicle according to one embodiment of the present invention which has a sensor arrangement.

FIG. 1 shows a top view of a motor vehicle 1 according to one embodiment of the present invention. The motor vehicle 1 is designed as a passenger vehicle in the present example embodiment. The motor vehicle 1 comprises a driver assistance system 2. The driver assistance system 2 serves to support the driver in driving the motor vehicle 1. The driver assistance system 1 may comprise, for example, a parking assistance system, a blind spot assistant and/or an adaptive cruise control.

The driver assistance system 2 furthermore comprises a sensor arrangement 3. In the present instance, the sensor arrangement 3 comprises two sensor devices 9. Each of the sensor devices 9 is assigned in each case to a rear wheel 8 of the motor vehicle 1. Each of the sensor devices 9 comprises at least two ultrasound sensors 4, 5, 6. In the present example embodiment, each of the sensor devices 9 comprises a first ultrasound sensor 4, a second ultrasound sensor 5 and a third ultrasound sensor 6. The ultrasound sensors 4, 5, 6 are connected to a control device 7 for data transmission. Corresponding data lines are not shown here in the interests of clarity. The control device 7 is furthermore designed to provide a corresponding control signal with which the motor vehicle 1 can be manoeuvred at semi-autonomously. A corresponding intervention in a steering of the motor vehicle 1, in a braking system and/or a drive motor can be performed for this purpose. A corresponding warning signal can furthermore be output to the driver of the motor vehicle 1 as a result of a control signal which is provided by the control device.

FIG. 2 shows a side view of the tailgate area of the motor vehicle 1 according to FIG. 1. It is evident here that the three ultrasound sensors 4, 5, 6 are arranged behind a wheel arch lining 13 of the motor vehicle 1. The three ultrasound sensors 4, 5, 6 are therefore arranged on a side of the wheel arch lining 13 facing away from the wheel 8. The wheel arch lining 13 is arranged inside the wheel arch and may be made, for example, from a plastic.

The first ultrasound sensor 4, the second ultrasound sensor 5 and the third ultrasound sensor 6 are preferably designed with an identical structure. The ultrasound sensors 4, 5, 6 in each case comprise a membrane which may be designed, for example, in the shape of a pot. The membrane may be made from aluminium and may have a resonant frequency of around 50 kHz. A transducer element which may be formed, for example, by a piezoelectric element, is arranged inside the membrane. The transducer element is mechanically coupled with the membrane. Vibrations of the membrane can thus be detected using the transducer element and can be output as a sensor signal, particularly in the form of an electric voltage. The ultrasound sensors 4, 5, 6 may be held in each case with a corresponding retaining element on the rear side of the wheel arch lining 13. In particular, the ultrasound sensors 4, 5, 6 are arranged in such a way that the respective membranes of the ultrasound sensors 4, 5, 6 are mechanically coupled with the wheel arch lining 13.

The motor vehicle 1 is moved on a road 11 or on a surface 10 of the road 11. In the present instance, the motor vehicle 1 is moved in a forward direction. The wheel 8 of the motor vehicle 1 is rolled here on the road 11. As a result, the wheel 9 is rotated along a direction of rotation 21. In the present instance, water 12 is present on the surface 10 of the road 11. The water 12 which is present on the surface 10 of the road 9 is thrown up by the rotation of the wheel 8 and impacts on the wheel arch lining 13. As a result of the impact of the water 11 or the water drops or spray water on the wheel arch lining 13, a sound signal is generated inside the wheel arch. Mechanical vibrations are furthermore induced in the wheel arch lining 13. The mechanical vibrations of the wheel arch lining can be detected by means of the ultrasound sensors 4, 5, 6. The mechanical vibration of the membrane of the respective ultrasound sensors 4, 5, 6 is detected by means of the transducer element for this purpose. A sensor signal E can be output with the respective ultrasound sensors 4, 5, 6.

FIG. 3 shows the sensor signals E of the ultrasound sensors 4, 5, 6 depending on time. In the present instance, a digital sensor signal E is output in each case with the ultrasound sensors 4, 5, 6. The digital sensor signal E has the value 0 if the vibration of the membrane exceeds a predetermined threshold value. Otherwise, the sensor signal E has the value 1. The diagram 16 describes an amplitude A of the sensor signal of the first ultrasound sensor 4 depending on time t. The diagram 17 describes the amplitude A of the sensor signal E of the second ultrasound sensor 5 depending on time t. The diagram 18 described the amplitude A of the sensor signal E of the third ultrasound sensor 6 depending on time t. In the present instance, the case is shown in which a relatively small amount of water 12 is present on the surface 10 of the road 11. In this case, the water 12 present on the road 11 is thrown up to the first ultrasound sensor 4. In the present instance, this is evident is the area 19 of the diagram 16, in which a corresponding sensor signal E which has vibrations is provided with the first ultrasound sensor 4. These vibrations describe the impact of the water 12 on the wheel arch lining 13, as a result of which mechanical vibrations are induced in the membrane of the first ultrasound sensor 4.

FIG. 4 shows the diagram according to FIG. 3 for the case where a larger amount of water 12 is present on the road 11. The water 12 is thrown up here into the area of the wheel arch 13 which is assigned to the first ultrasound sensor 4 and the second ultrasound sensor 5. Corresponding sensor signals E which describe the impact of the water 11 on the wheel arch lining 13 can thus be received with both the first ultrasound sensor 4 and the second ultrasound sensor 4. In the present instance, this is evident in the area 19 of the diagram 16 and in the area 20 of the diagram 17.

If the amount of water 12 which is present on the surface 10 of the road 11 exceeds a predetermined limit value, a warning signal can be output to the driver, for example using the driver assistance system 2. A corresponding symbol, for example, can be presented on a display device of the motor vehicle 1 for this purpose. The driver assistance system 2 can similarly perform a braking intervention. This allows the speed of the motor vehicle 1 to be reduced. The risk of aquaplaning can thus be reduced.

The invention claimed is:

1. A sensor arrangement for detecting a state of a road, comprising:
   a sensor device for detecting an impact of water on a wheel arch lining of a motor vehicle while the motor vehicle is travelling on the road; and
   a control device for detecting the state of the road on the basis of an impact of the water detected by the sensor device,
   wherein the sensor device has a first and a second ultrasound sensor which in each case receive an ultrasound signal and detect the impact of the water on the wheel arch lining, wherein the first and the second ultrasound sensor are arranged apart from one another at different heights on or in the same wheel arch lining.

2. The sensor arrangement according to claim 1, wherein the first and the second ultrasound sensor are arranged apart from one another along a direction of rotation of a wheel of the motor vehicle.

3. The sensor arrangement according to claim 1, wherein the first ultrasound sensor is arranged in front of the second ultrasound sensor along the direction of rotation of the wheel when the motor vehicle is moved in a forward direction.

4. The sensor arrangement according to claim 1, wherein the first and the second ultrasound sensor are arranged so that the water impacting on the wheel arch lining induces a mechanical vibration in a respective membrane of the first and the second ultrasound sensor.

5. The sensor arrangement according to claim 1, wherein the first and the second ultrasound sensor in each case output a sensor signal and the control device detects the state of the road on the basis of the respective sensor signals.

6. The sensor according to claim 5, wherein the control device detects a presence of water on a surface of the road on the basis of the sensor signals of the first and/or the second ultrasound sensor.

7. The sensor according to claim 5, wherein the control device determines an amount of the water which is present on the surface of the road on the basis of the sensor signals of first and/or the second ultrasound sensor.

8. The sensor according to claim 1, wherein the first and the second ultrasound sensor are arranged on a side of the wheel arch lining facing away from the wheel of the motor vehicle.

9. The sensor according to claim 1, wherein the sensor device has at least one third ultrasound sensor which is arranged on or in the wheel arch lining.

10. A driver assistance system for a motor vehicle with a sensor arrangement according to claim 1.

11. The driver assistance system according to claim 10, wherein the driver assistance system outputs a warning signal to a driver of the motor vehicle depending on the state of the road detected with the sensor arrangement.

12. The driver assistance system according to claim 10, wherein the driver assistance system adjusts the speed of the motor vehicle depending on the state of the road detected with the sensor arrangement.

13. A motor vehicle with a driver assistance system according to claim 10.

14. A method for detecting a state of the road, comprising:
  detecting an impact of water on a wheel arch lining of the motor vehicle by sensor device while a motor vehicle is travelling on the road; and
  detecting the state of the road by a control device on the basis of the impact of the water detected by the sensor device,
  receiving, by a first and a second ultrasound sensor of the sensor device, in each case, an ultrasound signal,
  wherein the first and second ultrasound sensors are arranged apart from one another at different heights on or in the same wheel arch lining, and wherein the impact of the water on the wheel arch lining is detected by the first ultrasound sensor and the second ultrasound sensor.

* * * * *